United States Patent
Hwang

(10) Patent No.: US 9,628,750 B2
(45) Date of Patent: Apr. 18, 2017

(54) TRANSMISSION SCHEME AND IMAGE QUALITY ADAPTIVE SECURITY CAMERA AND DVR SYSTEM

(75) Inventor: In-Jun Hwang, Yongin-si (KR)

(73) Assignee: PIXELPLUS CO., LTD., Suwon (KR)

( * ) Notice: Subject to any disclaimer, the term of this patent is extended or adjusted under 35 U.S.C. 154(b) by 0 days.

(21) Appl. No.: 14/348,554

(22) PCT Filed: Aug. 9, 2012

(86) PCT No.: PCT/KR2012/006335
§ 371 (c)(1),
(2), (4) Date: Mar. 28, 2014

(87) PCT Pub. No.: WO2013/048002
PCT Pub. Date: Apr. 4, 2013

(65) Prior Publication Data
US 2014/0241703 A1    Aug. 28, 2014

(30) Foreign Application Priority Data
Sep. 29, 2011  (KR) .................. 10-2011-0098746

(51) Int. Cl.
*H04N 5/76* (2006.01)
*H04N 5/77* (2006.01)
(Continued)

(52) U.S. Cl.
CPC ............... *H04N 5/772* (2013.01); *H04N 5/76* (2013.01); *H04N 7/088* (2013.01); *H04N 7/18* (2013.01);
(Continued)

(58) Field of Classification Search
None
See application file for complete search history.

(56) References Cited

U.S. PATENT DOCUMENTS

| 2001/0019365 A1 | 9/2001 | Kim et al. | |
| 2007/0154187 A1* | 7/2007 | Koda | G11B 20/00 386/330 |

(Continued)

FOREIGN PATENT DOCUMENTS

| CN | 1312647 A | 9/2001 |
| CN | 1893643 A | 1/2007 |

(Continued)

OTHER PUBLICATIONS

International Search Report for PCT/KR2012/006335 filed on Aug. 9, 2012.

*Primary Examiner* — Eileen Adams

(57) ABSTRACT

The present invention relates to an image quality adaptive video security system, a security camera generating an original video signal from a camera sensor, inserting an image quality discrimination signal including image quality information for video to the original video signal and generating a video signal. A DVR system determines whether a video signal from a security camera is transmitted in an analog transmission scheme or in a digital transmission scheme. In the case of the analog transmission scheme, the DVR system decodes the analog video signal to a first digital component video signal and detects image quality information. In a case of the digital transmission scheme, the DVR system converts the digital video signal to a digital second component video signal and detects image quality information. A video processing unit scales, compresses, stores or displays the first or the second component video signal with reference to the image quality information of the detected analog or digital video signal.

9 Claims, 4 Drawing Sheets

(51) Int. Cl.
  *H04N 7/18* (2006.01)
  *H04N 9/79* (2006.01)
  *H04N 9/82* (2006.01)
  *H04N 7/088* (2006.01)

(52) U.S. Cl.
  CPC ......... *H04N 9/7921* (2013.01); *H04N 9/8205* (2013.01)

(56) References Cited

U.S. PATENT DOCUMENTS

| | | |
|---|---|---|
| 2008/0316361 A1 | 12/2008 | Ito et al. |
| 2009/0027490 A1 | 1/2009 | Hirai et al. |
| 2009/0113389 A1* | 4/2009 | Ergo ................ G06F 3/011 717/120 |
| 2012/0159534 A1* | 6/2012 | Quan ................ H04N 7/169 725/31 |

FOREIGN PATENT DOCUMENTS

| | | |
|---|---|---|
| CN | 101329857 A | 12/2008 |
| CN | 102075767 A | 5/2011 |
| KR | 10-2006-0068263 A | 6/2006 |
| KR | 10-2007-0058811 A | 6/2007 |
| KR | 10-2010-0064648 A | 6/2010 |
| KR | 10-2001-0036928 A | 5/2011 |

\* cited by examiner

TRANSMISSION SCHEME AND IMAGE QUALITY ADAPTIVE SECURITY CAMERA AND DVR SYSTEM

TECHNICAL FIELD

The present invention relates to an adaptive video security system for processing a video signal using a different scheme based on a transmission scheme from a security camera to a digital video recorder (DVR) system and image quality of the transmitted video. More particularly, the present invention relates to a video transmission scheme and a video image quality adaptive DVR system that may determine whether a video signal is an analog video signal transmitted using an analog transmission scheme from a security camera that generates an analog video signal by including image quality information in an original video signal or a digital video signal transmitted using a digital transmission scheme from a security camera, and may convert an analog video signal to a first digital component video signal and detect analog video image quality information from the analog when the received video signal is determined as the analog video signal, and may convert a digital video signal to a second digital component video signal and detect digital video image quality information from the digital video signal when the received video signal is determined as the digital video signal, and, in a video signal processing operation, may scale, compress, store, or display the first digital component video signal by referring to the analog video image quality information in the case of the analog, and may scale, compress, store, or display the second digital component video signal by referring to the digital video image quality information in the case of the digital.

BACKGROUND ART

A digital video recorder (DVR) system refers to a digital video storage device that stores a digital video signal in a large storage device such as a hard disk drive (HDD) and enables a user to play the digital video signal if necessary. Such the DVR system is also employed in a security system and compresses and processes video input from a plurality of security cameras and enables long-hour recording, a quick search, and a clear image playback. Also, the DVR system supports real-time video transmission and remote monitoring over the Internet by integrating a network function. Accordingly, the utility value of the DVR system is increasing.

An analog camera used for the DVR system may be classified based on image quality. For example, there are a low image quality camera having a video band of about 6 MHz and about 720 horizontal pixels (hereinafter, a video of such image quality is referred to as a "low image quality video") and a recent high image quality camera having a video band of about 8 MHz and about 960 horizontal pixels (hereinafter, a video of such image quality is referred to as a "high image quality video") to output a further vivid image. However, the DVR system requires image quality information of an input video to perform video processing such as video scaling, compressing, storing, or displaying. Only when a camera transmits video image quality information and the DVR system recognizes the video image quality information and is set in interaction with the video image quality information, the DVR system may be optimally utilized.

In general, a standard format of an analog video includes a national television system committee (NTSC) scheme in which a single frame includes 525 video lines and a phase alternation by line (PAL) scheme in which a single frame includes 625 video lines. While maintaining a standard format of an NTSC or PAL video signal without deformation or damage to video information, additional information such as a closed caption (CC) and a teletext may be transferred. In an analog video signal standard format, such additional information is included in a vertical blanking interval (VBI) and thereby transmitted using a characteristic that the additional information is not displayed on a screen in the VBI. Video image quality information between an analog camera and the DVR system may be transmitted using the VBI.

The resolution of a digital camera used for the DVR system may be classified into 720P, 1080I, and 1080P, and may be developed to be further diversified in the near future. Similar to the analog camera, even in the case of the digital camera, the DVR system requires image quality information of an input video to perform video processing such as video scaling, compressing, storing, or displaying. Only when a camera transmits video image quality information and the DVR system recognizes the video image quality information and is set in interaction with the video image quality information, the DVR system may be optimally utilized. However, when a video signal transmitted from the digital camera is transmitted using a serial digital interface (SDI), image quality information is included in digital information. Depending on cases, image quality information may be known by measuring the number of valid pixels included in video or measuring a clock frequency. For example, when the number of valid pixels is 720×1280 and a transmission clock is 74.25 MHz, the image quality may be determined as a 720P format.

The present invention has been made in an effort to outperform the aforementioned issues found in the related art and to provide a transmission scheme that may insert video image quality information and thereby transmit a video signal while maintaining a standard format of the video signal in an analog camera output, and enable a DVR system to determine a transmission scheme of the received video signal and video image quality of the received video signal and to differentiate video processing based on the determined video signal transmission scheme and video signal image quality, and to provide a video image quality adaptive DVR system. In detail, an analog camera inserts a signal (hereinafter, referred to as an "image quality determination signal") having image quality information in a VBI of a video signal and thereby transmits the video signal to a DVR system. The DVR system determines whether the received video signal is an analog video signal or a digital video signal and converts the video signal to a component video signal and detects the image quality information using a video decoder when the received signal is the analog video signal, and converts the received video signal to a component video signal and detects the image quality information using a video receiver when the received video signal is the digital video signal, selects the component video signal and the video image quality information based on the determination of the video transmission scheme, and performs video processing, such as video scaling, compressing, storing, or displaying, on the selected component video based on the selected video image quality.

DETAILED DESCRIPTION OF THE INVENTION

Technical Problem

The present invention has been made in an effort to outperform the aforementioned issues found in the related art and to provide a transmission scheme that may insert video image quality information and thereby transmit a video signal while maintaining a standard format of the video signal in an analog camera output, and enable a digital video recorder (DVR) system to determine a transmission scheme of the received video signal and video image quality of the received video signal and to differentiate video processing based on the determined video signal transmission scheme and video signal image quality, and to provide a video image quality adaptive DVR system. In detail an analog camera inserts a signal (hereinafter, referred to as an "image quality determination signal") having image quality information in a VBI of a video signal and thereby transmits the video signal to a DVR system. The DVR system determines whether the received video signal is an analog video signal or a digital video signal and converts the video signal to a component video signal and detects the image quality information using a video decoder when the received signal is the analog video signal, and converts the received video signal to a component video signal and detects the image quality information using a video receiver when the received video signal is the digital video signal, selects the component video signal and the video image quality information based on the determination of the video transmission scheme, and performs video processing, such as video scaling, compressing, storing, or displaying, on the selected component video based on the selected video image quality.

Technical Solution

To solve the aforementioned issues found in the related art, an aspect of the present invention proposes a security camera for an image quality adaptive video security system, the security camera including: a video signal generator configured to generate an original video signal from a camera sensor; and an image quality information inserter configured to generate an analog video signal by inserting, in the original video signal, an image quality determination signal including quality information of a video.

Another aspect of the present invention proposes an image quality adaptive digital video recorder (DVR) system, including: an image quality information detector configured to receive, from a security camera, an analog video signal in which an image quality determination signal including image quality information of a video is inserted, and to detect the image quality information of the video from the image quality determination signal; a decoder configured to output a digital component video signal by decoding the received analog video signal by referring to the detected image quality information; and a video processing unit configured to scale, compress, store, or display the digital component video signal. Here, the image quality information may be referred to only by the decoder, may be referred to only by the video processing unit, or may also be referred to by both the decoder and the video processing unit.

Still another aspect of the present invention proposes a complex image quality adaptive DVR system, including: a video transmission scheme detector configured to determine whether a video signal received from a security camera is an analog video signal transmitted using an analog transmission scheme or a digital video signal transmitted using a digital transmission scheme; an image quality information detector and signal converter configured to decode the analog video signal to a first digital component video signal and to detect analog video image quality information from the analog video signal when the received video signal is determined as the analog video signal, and to convert the digital video signal to a second digital component video signal and to detect digital video image quality information from the digital video signal when the received video signal is determined as the digital video signal; and a video signal processing unit configured to scale, compress, store, or display the first digital component video signal by referring to the detected image quality information of the analog video signal in the case of an analog, and to scale, compress, store, or display the second digital component video signal by referring to the detected image quality information of the digital video signal in the case of a digital.

Advantageous Effects

The present invention may determine whether a video signal transmitted from a camera connected to a digital video recorder (DVR) system is an analog video signal transmitted using an analog transmission scheme or a digital video signal transmitted using a digital transmission scheme, and may automatically set the DVR system based on the determination. Accordingly, there is no need to install the DVR system by considering a transmission scheme of the camera when installing the DVR system. Also, the present invention may automatically determine image quality (for example, low image quality and high image quality) of a video received by the DVR system and thus, there is no need to install the DVR system by considering image quality of the camera when installing the DVR system. In a case that the camera is changed to a camera of a different transmission scheme or a camera of different image quality after installing the DVR system, the DVR system may automatically adapt to the changed camera without any manual settings of the DVR system. Accordingly, it is possible to save maintenance cost and convenient to use the DVR system. Also, it is possible to develop the DVR system that is easily adaptable to the image quality of the input video and capable of efficiently using a storage space (HDD) for recording and storing the received video. It is possible to configure, into a single DVR system, DVR systems respectively supporting security cameras having an analog transmission or digital transmission and low image quality, high image quality, or another image quality. Thus, the present invention is advantageous in economical and technical aspects.

BRIEF DESCRIPTION OF DRAWINGS

The same reference numerals refer to the same constituent elements illustrated in the drawings.

BEST MODE

Figure 1:
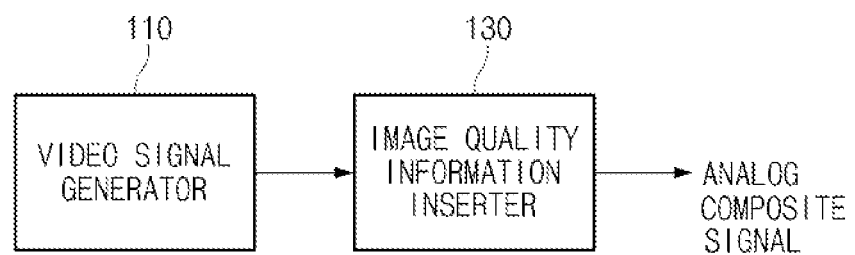
FIG. 1 illustrates a security camera according to an exemplary embodiment of the present invention.

FIG. 1 illustrates a security camera according to an exemplary embodiment of the present invention. In general, the security camera may include an image sensor (not shown), such as a coupled charged device (CCD) configured to convert light to an electrical signal, a video signal generator 110 configured to generate an original video signal (video signal) by inserting a horizontal synchronization (sync) signal and a vertical sync signal in the electrical signal, and an image quality information inserter 130 configured to detect a vertical blanking interval (VBI) using the sync signals, and to insert information capable of determining image quality in a predetermined area of the detected VBI. A signal representing information capable of determining the image quality, which is inserted at an image quality information inserter 130, is hereinafter referred to as an "image quality determination signal". Also, although not illustrated in FIG. 1, the security camera may further include a digital-to-analog converter (DAC) configured to convert a digital video to an analog video signal and a sync signal detector to detect a sync signal from the video signal.

Basically, the VBI is not displayed in a video and thus, is most appropriate to insert additional information while maintaining a standard format of a video signal. The VBI includes a plurality of video lines, and the image quality determination signal may be inserted in one or at least two video lines among the plurality of video signals. An insertion type of the image quality determination signal is described in more detail with reference to FIG. 4.

A sync signal detection for detecting the VBI may also perform a sync detection from the original video signal and may also use a sync signal employed in the video signal generator 110. Also, the image quality determination signal may be inserted in an original video signal in an analog form and may also be inserted in a digital output of the video signal generator 110.

According to an exemplary embodiment, an analog video signal may be generated by converting an original video signal to an analog form through a DAC before inserting image quality information, detecting a sync signal from the converted analog original video signal, and then inserting image quality information in an analog form in a VBI. According to another exemplary embodiment, an image quality determination signal may be digitally inserted in an original video signal with a digital form output from the video signal generator 110 during a VBI using a sync signal used by the video signal generator 110 and a video signal in a digital form in which image quality information is inserted may also be converted to an analog video signal through a DAC. As described above, the analog video signal in which image quality information is inserted, that is, an analog composite signal may be transmitted to a digital video recorder (DVR) system through a transmission cable.

Figure 2:
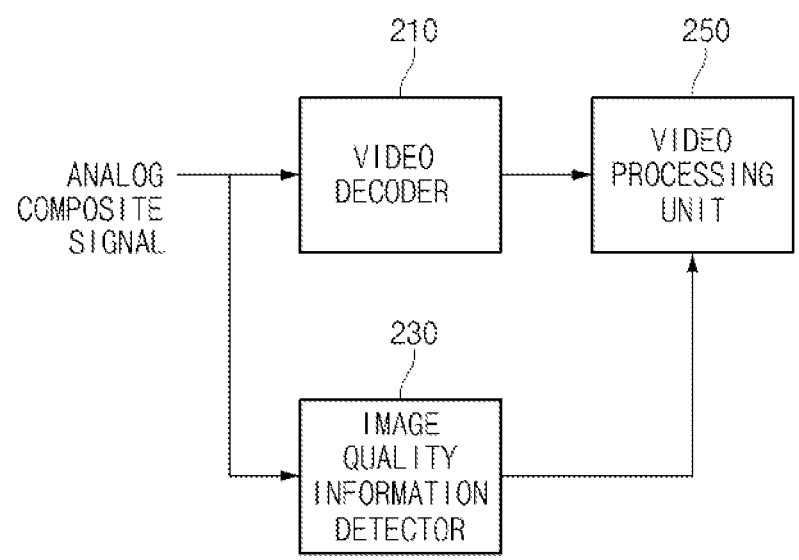
FIG. 2 illustrates an image quality adaptive digital video recorder (DVR) system according to an exemplary embodiment of the present invention.

FIG. 2 illustrates a DVR system according to an exemplary embodiment of the present invention. The DVR system may include a decoder 210 configured to convert a video signal input to the DVR system to a digital component video signal, an image quality information detector 230 configured to detect image quality information included in an image quality determination signal by referring to the video signal, and a video processing unit 250 configured to perform video processing, such as scaling, compressing, storing, or displaying, on the digital component video signal using a different scheme based on the detected image quality information. Although not illustrated in FIG. 2, the DVR system may further include an analog-to-digital converter (ADC) configured to convert the input analog video signal to a digital form and a sync signal detector configured to detect a sync signal from the analog video signal.

A horizontal sync signal and a vertical sync signal for detecting a VBI may also be detected from the input analog video signal, and may also be detected from a digital video signal converted by the ADC, although not illustrated. A sync signal detected by the decoder 210 for video decoding may also be used.

Also, the decoder 210 generates a digital component video signal through a process of separating a luminance signal Y and a chrominance signal C from the input analog video signal, and demodulating the chrominance signal C. A description relating to a general decoding process is omitted.

The image quality information detector detects a predetermined area (for example, a predetermined video line) of a VBI using the detected horizontal sync signal and vertical sync signal, and determines image quality of a video based on a signal detected in the above section. The predetermined area may be preset and the image quality information may be divided in two types, high image quality and low image quality, and thereby be inserted as different sets of information. However, by employing a scheme of inserting additional information in the case of the high image quality and not inserting additional information in the case of the low image quality, a case in which the additional information is inserted in the VBI may be determined as the high image quality and an opposite case may also be determined as the low image quality. Also, similar to detection of a sync signal, image quality information may also be detected from a received analog video signal and may also be detected from a video signal in a digital form converted by the ADC.

In the present example, although image quality information is illustrated to be referred to only by the video processing unit 250, the image quality information may also be referred to by the decoder 210 and may also be referred to by both the decoder 210 and the video processing unit 250. For example, in the case of performing decoding by referring to image quality information (for example, high image quality or low image quality) received from the image quality information detector, a digital component video signal may be output by setting a decoding clock according to the low image quality or the high image quality or by correcting or enhancing the image quality. The video processing unit 250 may process the digital component video signal by referring to image quality information received from the image quality information detector. That is, the video processing unit 250 performs scaling, compressing, storing, or displaying of the video based on the image quality information (for example, high image quality or low image quality) of the video corresponding to the image quality information.

As described above, a DVR system is automatically set to be suitable for each image quality with respect to a plurality of cameras having different image quality by performing video processing using image quality information inserted in a VBI of an analog video signal and thus, a unified DVR system may be utilized. That is, it is possible to implement an image quality adaptive video security system that performs appropriate video processing (for example, video scaling, storing, compressing, or displaying) based on image quality.

Figure 3:
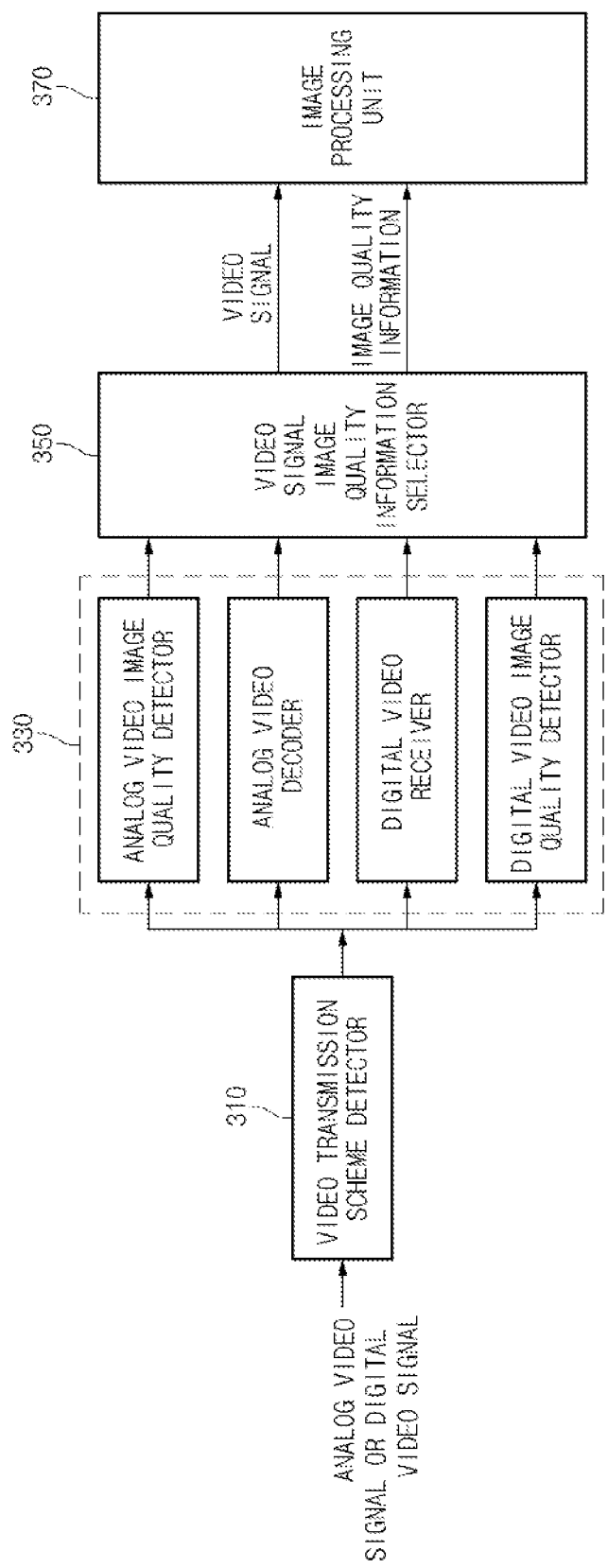
FIG. 3 illustrates a complex image quality adaptive DVR system using a video transmission scheme and image quality determination information according to an exemplary embodiment of the present invention.

FIG. 3 illustrates a complex image quality adaptive DVR system using a video transmission scheme and image quality determination information according to an exemplary embodiment of the present invention. A video security system having received a video from a security camera may include a video transmission scheme detector 310 configured to determine whether an input video is an analog video signal transmitted using an analog transmission scheme or a digital video signal transmitted using a digital transmission scheme, an image quality information detector and signal converter 330 including an analog video decoder configured to convert an analog video signal to a first digital component video signal and an analog video image quality detector configured to determine image quality of the analog video signal when the input video is an analog video signal transmitted using the analog transmission scheme, or a digital video receiver configured to convert a digital video signal to a second digital component video signal and a digital video image quality detector configured to determine image quality of the digital video signal when the input video is a digital video signal transmitted using the digital transmission scheme, and a video processing unit 370 configured to scale, compress, store, or display the first digital component video signal by referring to the detected image quality information of the analog video signal in the case of an analog, and to scale, compress, store, or display the second digital component video signal by referring to the detected image quality information of the digital video signal in the case of a digital.

The video transmission scheme detector 310 may be divided in an analog detector configured to determine whether the received video signal is the analog video signal and a digital detector configured to determine whether the received video signal is a digital video signal. The analog detector may determine a connection of an analog signal by referring to strength of the received analog video signal, a format of a sync signal, phase locked loop (PLL) state information of a sync signal detected when the analog video decoder decodes a video, and color signal PLL state information. The digital detector may determine a connection of a digital signal by referring to strength of the received digital video signal, a format of a sync signal, a clock frequency, and clock PLL state information. Next, a final video transmission scheme may be detected by referring to a detection result of the analog detector and a detection result of the digital detector.

The analog video decoder performs a process of converting the analog video signal to a digital video signal, detecting the sync signal from the converted digital video signal, correcting a video signal level, separating a black-and-white signal and a color signal, correcting a color signal level, demodulating the color signal, and thereby converting the analog video signal to a component video signal. A VBI may be detected using a sync signal from the sync signal detector in the analog video decoder and image quality information may be detected from an image quality determination signal included in the detected VBI.

The digital video receiver performs a process of receiving a digital video and converting the digital video to a component video signal and uses a high speed serial transmission scheme such as an SDI. To convert a serial digital video signal to a parallel digital video signal, the digital video receiver may extract a clock synchronized with received image data, may convert serial data to parallel data based on the extracted clock, and may detect image quality information from information on the extracted clock or the extracted parallel image data.

A detection scheme of image quality information may employ an image quality information detection scheme of the DVR system described above with reference to FIG. 2. For example, image quality information may be divided in two types, high image quality and low image quality, and thereby be inserted as different sets of information. However, by employing a scheme of inserting additional information in the case of the high image quality and not inserting additional information in the case of the low image quality, a case in which the additional information is inserted in the VBI may be determined as the high image quality and an opposite case may also be determined as the low image quality, which may be applied to both the analog video image quality information detector and the digital video image quality information detector.

According to an exemplary embodiment, the present system may further include a video signal and image quality information selector 350 configured to select analog video image quality information and a first digital component video signal when the detected video transmission scheme is an analog transmission scheme, and to select digital video image quality information and a second digital component video signal when the detected video transmission scheme is a digital transmission scheme. The selected video signal and image quality information may be input to the video processing unit 370. The video processing unit 370 may scale, compress, store, or display the first or second digital component video signal by referring to the analog or digital video image quality information.

Figure 4:
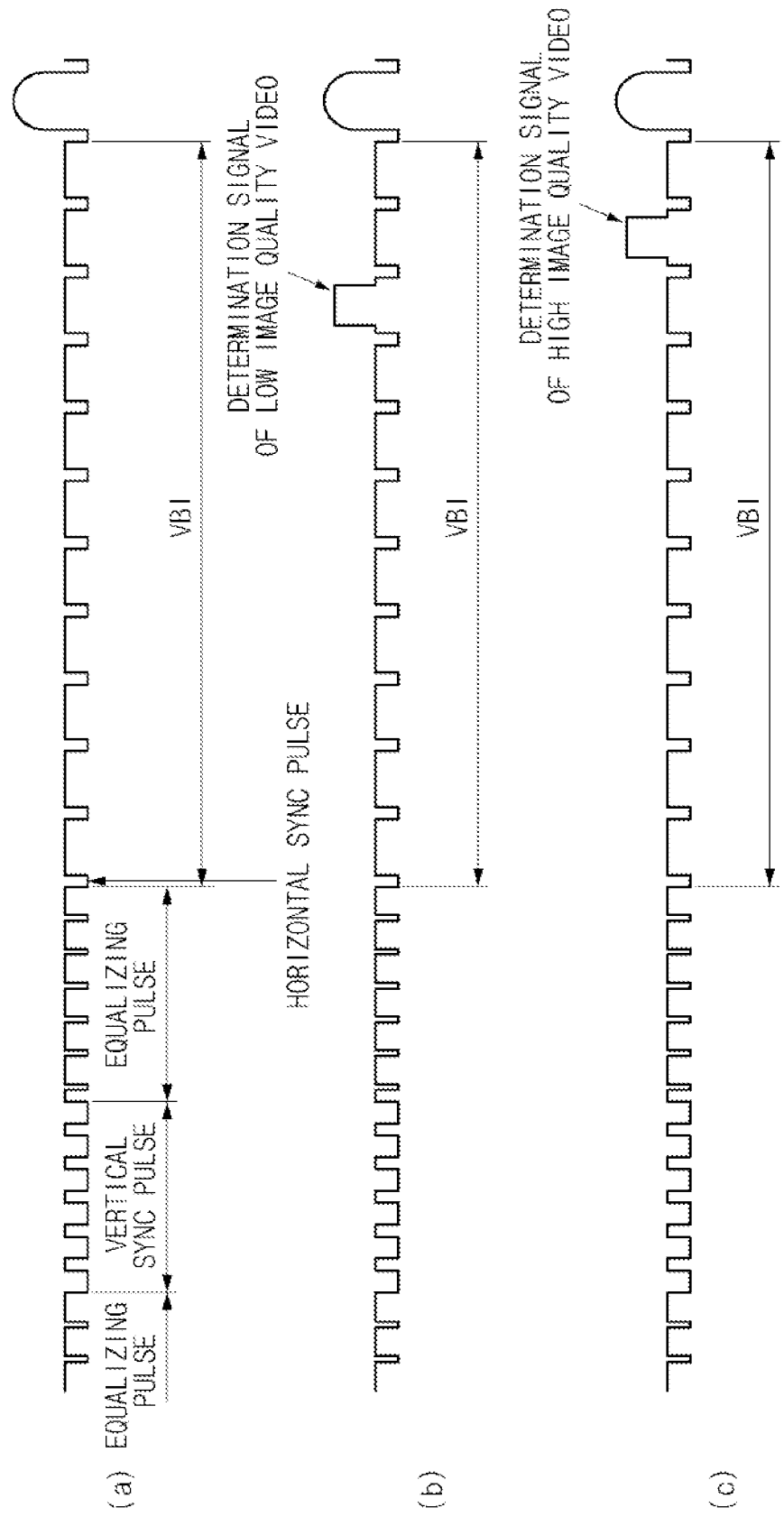
FIG. 4 illustrates an example of an analog video signal in which image quality determination information is inserted according to an exemplary embodiment of the present invention.

FIG. 4 illustrates an example of an analog video signal in which image quality determining information is inserted according to an exemplary embodiment of the present invention. (a) of FIG. 4 illustrates a video signal of a standard format and a VBI, (b) illustrates an example in which a low image quality video determination signal is inserted in a predetermined area of the video line in (a), and (c) illustrates an example in which a high image quality video determination signal is inserted.

In the case of generating an analog video signal, the image quality information inserter 130 generates an analog video signal by merging an original video signal and an image quality determination signal (that is, a VBI data signal). For example, as illustrated in FIG. 4, when an equalizing pulse, a vertical sync pulse, and an equalizing pulse are detected, a corresponding section is determined as a VBI and a horizontal sync pulse is counted. Here, an equalizing pulse refers to a timing control pulse of a vertical sync pulse. Next, an image quality determination signal indicating image quality information may be inserted in an N-th (for example, N=1~11) video line, for example, a fifth video line within the VBI. Here, the image quality determination signal is provided in one form of a VBI data signal (for example, closed caption (CC), wide screen signaling (WSS), and teletext).

According to an exemplary embodiment of the present invention, an image quality determination signal including image quality information may be included in at least one VBI. For example, as illustrated by (b) and (c) of FIG. 4, a determination signal of a low image quality video may be inserted in an n-th video line and a determination signal of high image quality video may be inserted in an (n+1)-th video line in a single VBI. The merged analog video signal may be detected by the image quality information detector 230. Information such as a low image quality video may be extracted with respect to an n-th inserted signal and information such as a high image quality video may be extracted with respect to an (n+1)-th inserted signal. For example, image quality information may be divided into at least three types of image quality information, not two types such as high image quality and low image quality. The image quality information may be inserted at different locations in a single VBI or may be inserted in different VBIs and thereby be determined, and may also be inserted in different signal forms at the same location.

According to still another exemplary embodiment, image quality information may be determined based on whether image quality information is inserted. For example, by not inserting a video determination signal in a VBI for a low image quality video signal and by inserting a video determination signal only for a high image quality video signal, when the video determination signal is detected in the image quality information detector 230, the detected video determination signal may be configured to be recognized as "high image quality".

Only the specific examples are described in detail to help understand the present invention, and thus, constituent elements disclosed in the present specification, connection and relationship therebetween, and functions thereof are only exemplary. In the present invention, the video signal generator 110 and the image quality information inserter 130 of the security camera are embodied to be physically integrated. However, depending on a necessity, each of the constituent elements may be configured in a physically separate form or in a form in which at least one constituent element is integrated. Similarly, although the image quality information detector 230, the video decoder 210, and the video processing unit 250 are embodied to be physically integrated, each of the constituent elements may be configured in a physically separate form or in a form in which at least one constituent element is integrated. Also, in the complex image quality adaptive DVR system, the video transmission scheme detector 310, the image quality information detector and signal converter 330, and the video processing unit 370 are illustrated to be integrated. However, each of the constituent elements may be configured in a physically separate form or in an integrated form depending on a necessity. Also, as described in the detailed description and illustrated in the drawings, the image quality information detector and signal converter 330 may include a decoder for analog signal conversion, an analog video image quality information detector, a receiver for digital signal conversion, and a digital video image quality information detector, which may be selectively configured or simultaneously configured based on an analog or digital transmission scheme. As described above, the system further including the video signal and image quality information selector 350 may be configured. A transmission scheme detected from the video transmission scheme detector 310 may also be referred to in addition to a video signal and image quality information, based on an analog or a digital. Although an operation by a predetermined order is described in the drawings, operations are not necessarily performed in the predetermined order or sequential order to obtain an exemplary result.

The technical scope of the present invention described above with reference to the exemplary embodiments is not limited to the exemplary embodiments and it will be apparent to those skilled in the art that various changes and modifications may be made without departing from the spirit and scope of the invention. Accordingly, such modification examples or corrections fall within the scope of the invention disclosed in the claims.

Advantageous Effects

The present invention may provide a scheme of transmitting a video from a security camera to a digital video recorder (DVR) system and an adaptive video security system for processing a video signal using a different scheme based on image quality of the transmitted video.

The invention claimed is:

1. A complex image quality adaptive digital video recorder (DVR) system, comprising:

a video transmission scheme detector of the DVR system configured to determine whether a video signal received from a security camera is an analog video signal transmitted using an analog transmission scheme or a digital video signal transmitted using a digital transmission scheme;

an image quality information detector and signal converter of the DVR system configured to decode the analog video signal to a first digital component video signal and to detect analog video image quality information from the analog video signal when the received video signal is determined as the analog video signal, and to convert the digital video signal to a second digital component video signal and to detect digital video image quality information from the digital video signal when the received video signal is determined as the digital video signal; and a video signal processing unit of the DVR system configured to scale, compress, store, or display the first digital component video signal by referring to the detected image quality information of the analog video signal in the case of an analog, and to scale, compress, store, or display the second digital component video signal by referring to the detected image quality information of the digital video signal in the case of a digital, wherein the video transmission scheme detector determines whether the received video signal is the analog video signal transmitted using the analog transmission scheme or the digital video signal transmitted using the digital transmission scheme based on at least one of strength of the received video signal and a format of a sync signal included in the received video signal.

2. The complex image quality adaptive DVR system of claim 1, further comprising:

a video signal and image quality information selector configured to select image quality information by determining whether the image quality information is analog or digital video image quality information and a digital component video signal by determining whether a corresponding signal is the first or second digital component video signal, in order to select a signal to be output to the video signal processing unit from among signals output from the image quality information detector and signal converter, wherein the video signal processing unit scales, compresses, stores, or displays the selected digital component video signal by referring to the selected image quality information.

3. The complex image quality adaptive DVR system of claim 1, wherein the video transmission scheme detector includes an analog detector configured to determine whether the received video signal is the analog video signal and a digital detector configured to determine whether the received video signal is the digital video signal to thereby output the detected results, respectively, and detects the video transmission scheme by referring to the output analog detection result and digital detection result.

4. The complex image quality adaptive DVR system of claim 3, wherein the analog detector determines whether the received video signal is the analog video signal transmitted using the analog transmission scheme by referring to the strength of the received video signal, the format of the sync signal, and phase loop (PLL) state information of the sync signal detected, and PLL state information of a color signal when decoding an analog video.

5. The complex image quality adaptive DVR system of claim 3, wherein the digital detector determines whether the received video signal is the digital video signal transmitted using the digital transmission scheme by referring to the strength of the received video signal, the format of the sync signal, a clock frequency, and clock PLL state information.

6. A complex image quality adaptive digital video recorder (DVR) system, comprising:
a video transmission scheme detector of the DVR system configured to determine whether a video signal received from a security camera is an analog video signal transmitted using an analog transmission scheme or a digital video signal transmitted using a digital transmission scheme;
a signal converter of the DVR system configured to decode the analog video signal to a first digital component video signal when the received video signal is determined as the analog video signal, and to convert the digital video signal into a second digital component video signal when the received video signal is determined as the digital video signal; and
a video signal processing unit of the DVR system configured to scale, compress, store, or display the first digital component video signal in the case of an analog, and to scale, compress, store, or display the second digital component video signal in the case of a digital,
wherein the video transmission scheme detector determines whether the received video signal is the analog video signal transmitted using the analog transmission scheme or the digital video signal transmitted using the digital transmission scheme based on at least one of strength of the received video signal and a format of a sync signal included in the received video signal.

7. The complex image quality adaptive DVR system of claim 6, wherein the video transmission scheme detector includes an analog detector configured to determine whether the received video signal is the analog video signal and a digital detector configured to determine whether the received video signal is the digital video signal to thereby output the detected results, respectively, and detects the video transmission scheme by referring to the output analog detection result and digital detection result.

8. The complex image quality adaptive DVR system of claim 7, wherein the analog detector determines whether the received video signal is the analog video signal transmitted using the analog transmission scheme by referring to the strength of the received video signal, the format of the sync signal, and phase locked loop (PLL) state information of the sync signal detected, and PLL state information of a color signal when decoding an analog video.

9. The complex image quality adaptive DVR system of claim 7, wherein the digital detector determines whether the received video signal is the digital video signal transmitted using the digital transmission scheme by referring to the strength of the received video signal, the format of the sync signal, a clock frequency, and clock PLL state information.

* * * * *